United States Patent [19]
Trigon

[11] 3,945,009
[45] Mar. 16, 1976

[54] ANTENNAE WITH LINEAR APERTURE

[75] Inventor: Roland Trigon, Paris, France

[73] Assignee: CSF - Compagnie Generale de Telegraphie Sans Fil, Paris, France

[22] Filed: Feb. 17, 1967

[21] Appl. No.: 618,272

[30] Foreign Application Priority Data

Feb. 22, 1966 France .......................... 66.50605

[52] U.S. Cl. ................ 343/7.7; 343/777; 343/780; 343/840; 343/854

[51] Int. Cl.[2] ......................................... G01S 9/42

[58] Field of Search........... 343/7.7, 5 ST, 780, 854, 343/840, 777, 778

[56] References Cited

UNITED STATES PATENTS

| | | | |
|---|---|---|---|
| 2,721,263 | 10/1955 | Spencer | 343/780 X |
| 2,963,701 | 12/1960 | Hagaman | 343/100 (.6) |
| 2,965,895 | 12/1960 | Blasingame et al. | 343/7.7 |
| 3,005,199 | 10/1961 | Grandsard | 343/118 |

*Primary Examiner*—Maynard R. Wilbur
*Assistant Examiner*—Richard E. Berger
*Attorney, Agent, or Firm*—Cushman, Darby & Cushman

[57] ABSTRACT

In order to compensate for the displacement of a coherent pulse airborne radar, the latter is provided with means for alternately linearly moving forward and backward the phase centre of its antenna system, at the reception, from one cycle radar to the next.

The displacement of the phase centre is carried out by introducing a controllable dissymmetry in the illumination of the linear radiating aperture of the antenna system.

5 Claims, 4 Drawing Figures

Fig.5

ANTENNAE WITH LINEAR APERTURE

The present invention relates to antennae with linear aperture.

It is often useful, for example in the case of airborne radars that the equivalent point source, or phase centre, of such an antenna should be movable, for example, in order to eliminate fixed echoes.

It is on object of this invention to provide such an antenna in which the phase centre can be moved along a straight line.

According to the invention there is provided a method for linearly displacing the phase centre of an antenna having a linear radiating aperture, with respect to an original phase centre corresponding to a symmetrical illumination of said aperture, said method consisting in illuminating said aperture with a linear and variable dissymmetry with respect to said original phase centre.

For a better understanding of the invention and to show how the same may be carried into effect reference will be made to the drawings accompanying the following description in which.

Figure 1:
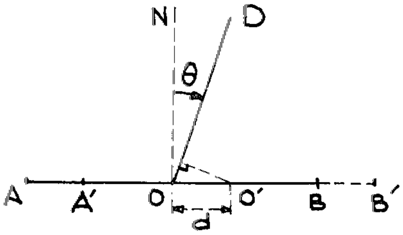
FIG. 1 shows diagrammatically the linear aperture of an antenna in two positions.

The radiation diagram of an antenna is given by the Fourier transform of the illumination on the radiating aperture of the antenna. For a linear aperture, such as AB in FIG. 1, and the centre point O of AB being selected as origin, a symmetrical illumination results in a radiation diagram which is equiphasal and symmetrical in modulus relative to the median plane of the aperture AB. The trace of this plane on that of the drawing is the straight line ON.

The phase centre of the antenna is at O.

If the aperture of the antenna is displayed by an amount d to A′ B′, the phase difference between the waves received at O and O′ is:

$$\Delta\phi = 2\pi \frac{d}{\lambda} \sin\theta \,, \qquad (1)$$

where $\theta$ is the angle formed by the direction D of origin of the waves received, with ON, and $\lambda$ is the wave length.

If the illumination of the aperture is rendered non-symmetrical, the aperture being in the position AB, the radiation diagram of the antenna remains symmetrical in modulus, but becomes uneven in phase, that is to say, with O as origin, the function representing the phase as a function of the angle $\theta$ is odd.

For relatively small angles, it is possible without displacing the aperture AB to obtain, by a dissymmetry of illumination, a radiation having the same phase law at O′, at a distance $d$ from O as if the aperture AB had been moved by $d$. A wave coming from the direction $\theta$ and received by the antenna with unsymmetrical illumination of the radiating aperture is therefore equivalent, from the point of view of phase, to a wave received from the same direction by the antenna with symmetrical illumination displaced by $d$. Thus, by introducing a dissymmetry into the illumination of the aperture of the antenna according to the invention, the centre of the phase of the antenna is shifted along its aperture.

Figure 2:
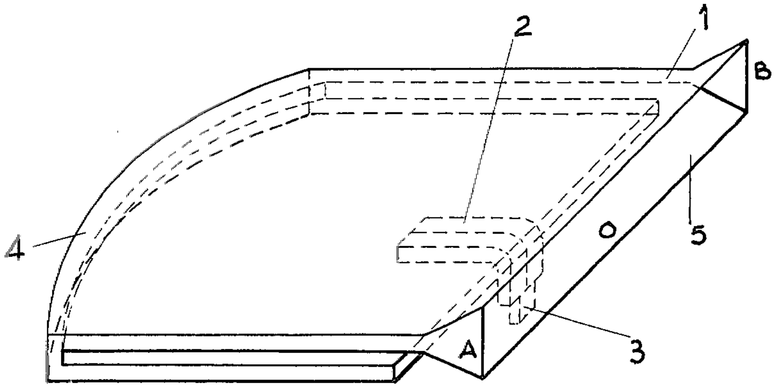
FIG. 2 shows an antenna embodying the improvement according to the invention.

FIG. 2 shows an antenna of the pill box type, using the invention. It is, in fact, easy to change the illumination of a focusing system (paraboloidal cylinder, lens, etc.) by using, for example, a primary source consisting of several horns which may be phase shifted in a variable manner, one relative to the other.

FIG. 2 shows an antenna 1 of the pill box type, folded in order to eliminate the shadow of the primary source.

This antenna 1 comprises a double primary source 2 supplied by a wave guide 3. This source radiates in the direction of a reflector 4 in the form of a parabolic cylinder which transmits the energy supplied by the source towards the radiating aperture 5.

Figure 3:
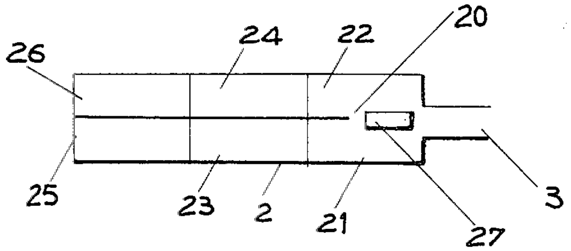
FIG. 3 shows an embodiment of the improvement according to the invention used in an antenna according to FIG. 2.

FIG. 3 shows diagrammatically an embodiment of the primary source 2.

The energy received from the guide 3 is divided amongst two channels 21 and 22 by means of a folded magic Tee 20, the fourth channel of which terminates in a matched load. The channels 21 and 22 comprise, respectively, phase shifters 23 and 24, for example, varactors. The phase-shift between the two channels is therefore variable by electric means. The energy passing through each of the two channels 21 and 22 is radiated respectively by the mouths 25 and 26. The phase-shift between the two channels shifts the illumination maximum of the reflector 4, and creates thereby the dissymmetry in the illumination of the radiating aperture AB. The phase centre of the antenna 1 is therefore mobile along AB as a function of the phase-shift between the two channels.

Such an antenna may, more particularly, be used in airborne radars for compensating at the reception the phase variation between two successive pulses, when the transmission of these impulses is coherent.

Figure 4:
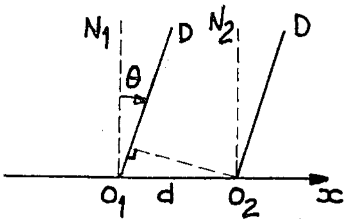
FIG. 4 is a diagram explaining the interest of the invention in the case of an airborne radar.

In FIG. 4, the axis $O_1O_2x$ represents the flight line of the aircraft carrying the radar. Between two pulses, the aircraft has travelled a distance $d$, which represents the distance between the two positions $O_1$ and $O_2$ of the centre of the aperture of the antenna. If the transmission is effected with the same phase in the direction D of a fixed target, the direction D is determined by the angle $\theta$, and the echoes received for two successive pulses present a phase-shift $4\pi d/\lambda \sin\theta$. If, with the antenna according to the invention, the centre of the phase is shifted forwards at the first reception by an amount $d$ (so that the phase centre coincides with $O_2$), and backwards at the second reception (so that it coincides with $O_1$), the dephasing between the echos received for the two successive impulses is compensated. To a coherent transmission corresponds a coherent reception.

It is also possible to utilize the shift of the phase centre both for the transmission and for the reception. In this case it is sufficient to displace the phase centre of the antenna by the amount $d/2$, in the forward direction during the transmission and the reception of the first pulse, and in the backward direction during the transmission and reception of the second pulse.

In this case, the phase centre of the antenna remains fixed and is located in the centre of $O_1O_2$.

Figure 5:
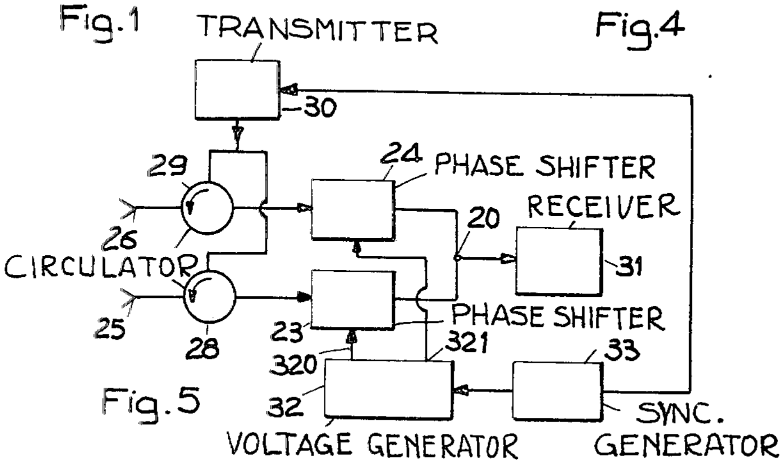
FIG. 5 shows an example of the application of the improved antenna according to the invention.

FIG. 5 shows an example of an application to an airborne radar in the case, where the phase centre is shifted only during the reception.

During the transmission, coherent pulses supplied by the transmitter 30 are transmitted without phase-shift to two apertures 25 and 26 by means of circulators 28 and 29.

During the reception, the echoes received from a target through the apertures 25 and 26 are passed to the receiver 31 via phase shifters 23 and 24.

These phase-shifters receive respectively the outputs 320 and 321 of a control voltage generator 32 which can have one or the other of two values in response to signals coming from the generator 33, generating the radar sync. signals. The operation of the system is a follows:

The signal relating to a target is produced by means of two successive pulses, that is to say, for example, by means of a so-called odd rank impulse followed by a so-called even rank impulse.

During the transmission of an odd impulse, the synchronizing signal generator 33 sends an impulse to the generator 32 which supplies at its outputs 320 and 321, respectively, the voltages $V_o + v$ and $V_o - v$, wherein $v$ is controlled in such a manner that the phase centre of the antenna is displaced by d in advance for the reception of the echo caused by this impulse. At the following even impulse, the voltages at the outputs 320 and 321 are reversed and the phase centre shifts therefore by the amount d in the backward direction for the reception of the echo (coming from the same target), caused by this even impulse. The voltage $v$ is controlled according to the distance d desired, and especially as a function of the speed of the aircraft.

It may also be more practical in certain cases to keep constant the amplitude d of displacement of the phase centre. In this case, the absolute value of the relative phase-shift is maintained constant, and it is the pulse repetition frequency of the radar transmitter that is varied as a function of the speed of the aircraft.

What is claimed is:

1. A reflector type antenna comprising a relfector having a linear radiating aperture and means for linearly displacing the antenna radiation phase center along said aperture, said means comprising at least two primary radiating sources illuminating said reflector, first means for feeding respective electromagnetic energy to said sources, and second means for controlling the phase-shift between the energy fed to one of said sources and that fed to the other.

2. An antenna according to claim 1, wherein said reflector is a folded pill-box.

3. An antenna according to claim 1, wherein said first means comprise a magic Tee having a first and a second arm respectively coupled to said primary sources, a third arm fed with the total energy of the antenna, and a fourth arm terminating in a matched load.

4. An improvement of a coherent pulse radar system comprising transmitting means, receiving means and synchronizing means, said improvement comprising: aerial means comprising two identical primary groups of n sources, where n is an integer, and controlling means, synchronized by said synchronizing means and coupled between said aerial means and said receiving means for applying a controlled relative phase-shift between the signals collected by said groups as an echo of a pulse radiated by said system, and inverting said relative phase-shift from a radar cycle to the next one.

5. An improvement according to claim 4, said controlling means comprising a first and a second voltage controlled phase-shifter inserted between said receiving means and respectively said groups, having respective control inputs, and a double voltage generator having a sync. input coupled to said synchronizing means and two outputs respectively coupled to said control inputs and supplying thereto a first and a second voltage alternately.

* * * * *